(12) United States Patent
Adragna et al.

(10) Patent No.: US 8,699,240 B2
(45) Date of Patent: *Apr. 15, 2014

(54) CHARGE-MODE CONTROL DEVICE FOR A RESONANT CONVERTER

(75) Inventors: Claudio Adragna, Monza (IT); Aldo Vittorio Novelli, S. Lorenzo Parabiago (IT); Christian Leone Santoro, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 513 days.

This patent is subject to a terminal disclaimer.

(21) Appl. No.: 12/979,631

(22) Filed: Dec. 28, 2010

(65) Prior Publication Data

US 2011/0157920 A1     Jun. 30, 2011

(30) Foreign Application Priority Data

Dec. 28, 2009   (IT) .............................. MI2009A2306

(51) Int. Cl.
*H02M 3/335*     (2006.01)

(52) U.S. Cl.
USPC ....................................................... 363/21.03

(58) Field of Classification Search
USPC .......................................... 363/21.02, 21.03
See application file for complete search history.

(56) References Cited

U.S. PATENT DOCUMENTS

| 4,694,383 | A | 9/1987 | Nguyen et al. |
| 5,552,979 | A | 9/1996 | Gu et al. |
| 6,711,043 | B2 * | 3/2004 | Friedman et al. ............... 365/51 |
| 2002/0067629 | A1 * | 6/2002 | Koike .............................. 363/97 |
| 2006/0215424 | A1 * | 9/2006 | Aso et al. ................... 363/21.01 |
| 2009/0196074 | A1 | 8/2009 | Choi |

OTHER PUBLICATIONS

Tang et al., "Charge Control: Modeling, Analysis and Design," Power Electronics Specialists Conference, 23rd Annual IEEE, vol. 1, pp. 503-511, 1992.
Tang et al., "Charge Control for Zero-Voltage-Switching Multi-Resonant Converter," Power Electronics Specialists Conference, 24th Annual IEEE, pp. 229-233, 1993.

* cited by examiner

*Primary Examiner* — Jue Zhang
(74) *Attorney, Agent, or Firm* — Seed IP Law Group PLLC (57) ABSTRACT

A control device for a resonant converter includes a first circuit structured to rectify a signal indicating the current circulating in the primary winding, a second circuit adapted to integrate at least the rectified signal and structured to generate at least a control signal of the switching circuit according to the integrated signal, and a third circuit adapted to send a reset command to the second circuit so as to inhibit the operation over a time period between the instant when the integrated signal reaches or exceeds a first signal and the instant of the next zero crossing of the signal, indicating the current circulating in the primary winding.

23 Claims, 4 Drawing Sheets

CHARGE-MODE CONTROL DEVICE FOR A RESONANT CONVERTER

BACKGROUND

1. Technical Field

The present disclosure relates to a charge-mode control device for a resonant converter.

2. Description of the Related Art

Forced switching converters (switching converters) with devices used for controlling them are known from the state of the art. Resonant converters are a wide range of forced switching converters characterized by the presence of a resonant circuit playing an active role in determining the input-output power flow. In these converters, a bridge (half bridge) consisting of four (two) power switches (typically power MOFSETs) supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave. As a result, the circulating power may be modulated by changing the frequency of the square wave, holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide dc power to the load. In offline applications, to comply with safety regulations, the rectification and filtering system supplying the load is coupled to the resonant circuit by a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Figure 1:
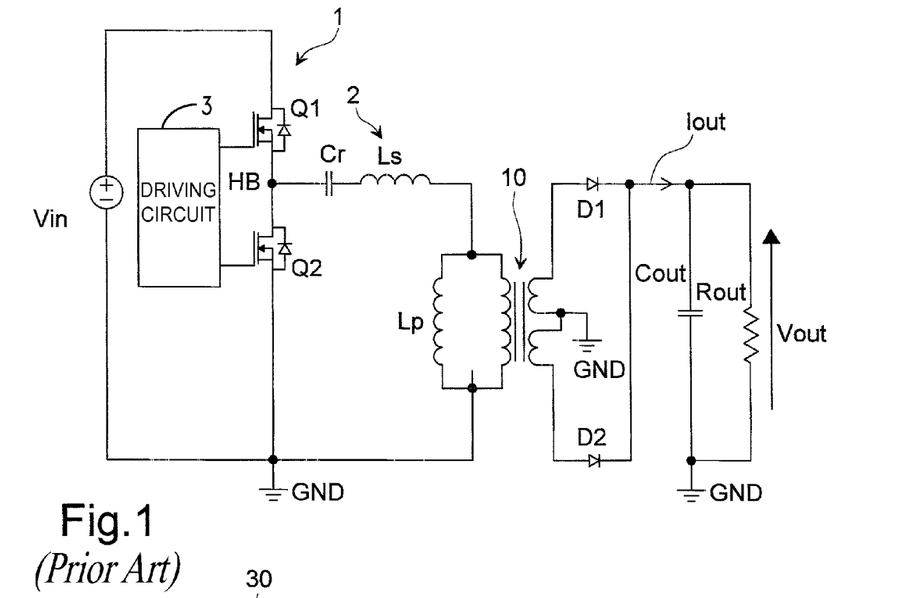
FIG. 1 shows a circuit schematic of a LLC resonant converter in accordance with a known design.

Presently, among the many types of resonant converters, the so-called LLC resonant converter is widely used, especially in the half bridge version thereof. The designation LLC comes from the resonant circuit employing two inductors (L) and a capacitor (C); a principle schematic of an LLC resonant converter is shown in FIG. 1. The resonant converter 1 comprises a half bridge of transistors Q1 and Q2 between the input voltage Vin and the ground GND driven by a driving circuit 3. The common terminal HB between the transistors Q1 and Q2 is connected to a circuit block 2 comprising a series of a capacitor Cr, an inductance Ls and another inductance Lp connected in parallel to a transformer 10 with a center-tap secondary. The two windings of the center-tap secondary of transformer 10 are connected to the anodes of two diodes D1 and D2 the cathodes of which are both connected to the parallel of a capacitor Cout and a resistance Rout; the voltage across the parallel Rout, Cout is the output voltage Vout of the resonant converter, while the dc output current Iout flows through Rout.

Resonant converters offer considerable advantages as compared to the traditional switching converters (non-resonant converters, typically PWM—Pulse Width Modulation—controlled): waveforms without steep edges, low switching losses in the power switches due to the "soft" switching thereof, high conversion efficiency (>95% is easily reachable), ability to operate at high frequencies, low EMI (Electro Magnetic Interference) generation and, ultimately, high power density (i.e. enabling to build conversion systems capable of handling considerable power levels in a relatively small space).

As in most dc-dc converters, a closed-loop, negative-feedback control system keeps the output voltage of the converter constant upon changing the operating conditions, i.e. the input voltage Vin and/or the output current Iout thereof. This is achieved by comparing a portion of the output voltage to a reference voltage Vref. The difference, or error signal Er, between the value provided by the output voltage sensing system (usually, a resistor divider) and the reference value is amplified by an error amplifier. Its output Vc modifies a quantity x inside the converter which the energy carried by the converter during each switching cycle substantially depends on. As discussed above, such a significant quantity in resonant converters is the switching frequency of the square wave stimulating the resonant circuit.

As in all control systems in dc-dc converters, the frequency response of the error amplifier should be properly designed so as to ensure:

a stable control loop (i.e. that, upon disturbances of the operating conditions of the converter, once the transient caused by the disturbance has finished, the output voltage tends to recover a steady state value close to that before the disturbance;

good regulation (i.e. the new constant value recovered by the output voltage following a disturbance is very close to that preceding the perturbation);

good dynamic performance (i.e. during the transient following a disturbance, the output voltage does not excessively deviate from the desired value and the transient itself is short).

The above-mentioned control objectives may be expressed in terms of some characteristic quantities of the transfer function of the control loop, such as the band width, the phase margin, the dc gain. In a dc-dc converter, these objectives may be achieved by acting on the frequency response of the error amplifier, modifying the gain thereof and conveniently placing the poles and zeroes of the transfer function thereof (frequency compensation). This is normally achieved by using passive networks comprising resistances and capacitors of appropriate value connected thereto.

However, in order to determine the frequency compensation needed to obtain the desired features of the transfer function of the control loop, it is necessary to know both the modulator gain, i.e. the gain of the system converting the control voltage Vc into the control quantity x, and the frequency response of the converter itself to the variations of the quantity x.

The modulator gain does not usually depend on the frequency, and is fixed inside the control integrated circuit.

Although dc-dc converters are strongly non-linear system just because of the switching action, with suitable approximations and under certain hypothesis, their frequency response may be described and represented by the same means used for linear networks and, therefore, by a transfer function characterized by gain, zeroes and poles. This transfer function essentially depends on the converter topology, i.e. the mutual configuration of the elements handling the power, on its operation mode, i.e. whether, at every switching cycle, there is a continuous current circulation in the magnetic part (Continuous Current Mode, CCM) or not (Discontinuous Current Mode, DCM), and on the quantity x controlled by the control loop. While in PWM converters different control methods are commonly used—traditionally, in resonant converters, the quantity used to control the converter is directly the switching frequency of the square wave applied to the resonant circuit.

Figure 2:
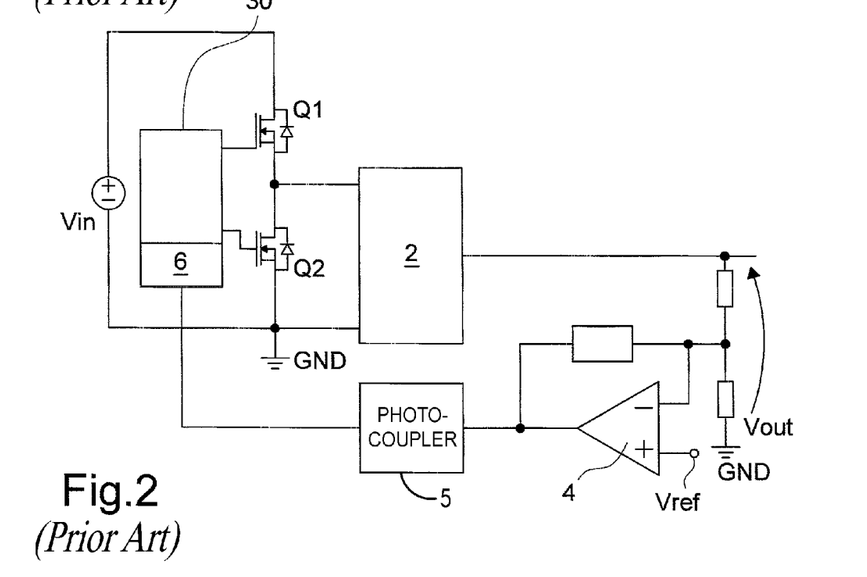
FIG. 2 shows a block schematic of a resonant converter with adjustment of the output voltage in accordance with the known design.

In all integrated control circuits for dc-dc resonant converters available in the market, the control directly operates on the oscillation frequency of the half bridge (Direct Frequency Control, DFC). FIG. 2 shows a control system for this type of resonant converters. The output of the error amplifier 4 on the secondary side, having a part of the output voltage Vout at the input of the inverting terminal and a reference voltage Vref on the non-inverting terminal, is transferred to the primary side by a photocoupler 5 so as to ensure the primary-secondary isolation required by the safety regulations, and acts upon a voltage-controlled oscillator (VCO) 6 or a current-controlled oscillator (ICO) inside the control integrated circuit 30.

This type of control arises two classes of problems. A first one relates to the fact that, unlike PWM converters, dynamic small-signal models for resonant converters expressed in terms of gain, poles and zeroes are not known in the literature (there are some approximated forms of questionable practical use). In other words, the transfer function of the power stage is not known. A second class of problems relates to the fact that, according to study results based on simulations, said transfer function of the power stage shows a strongly variable dc gain, and a number of poles varying from one to three and with a very mobile position, depending on the operating point. There is finally a zero due to the output capacitor.

The large gain variation and the highly variable pole configuration make the frequency compensation of the feedback control loop quite problematic. As a result, it is virtually impossible to obtain a transient response optimized under all the operating conditions, and a considerable trade-off between stability and dynamic performance is required. Additionally, the energy transfer strongly depends on the input voltage (audio-susceptibility), so that the control loop has to significantly change the operating frequency to compensate said variations. Since in the input voltage of the converter there is always an alternating component with a frequency twice that of the mains voltage, the loop gain at that frequency needs to be quite high to effectively reject said alternating component and significantly attenuate the residual ripple visible in the output voltage.

All these factors risk to rise problems which may be not all solvable, especially when the load supplied by the converter has great dynamic changes and/or there are strict specifications on the dynamic accuracy or the response speed or the rejection of the input ripple.

Finally, another problem related to the DFC control method is the sensitivity of the switching frequency to the value of the components in the resonant circuit (Cr, Ls and Lp). These values have a statistical spread due to their fabrication tolerances and this adversely affects the effectiveness of the protection circuits. In fact, generally speaking, to avoid that a converter may be operated abnormally, the control quantity x should be limited. In the case of resonant converters, the resonant controllers implementing DFC allow the operating frequency of the half bridge to be top and bottom limited. These limits should be set considering that, due to the above-mentioned value spread, the operating frequency range of the converter will change accordingly. The minimum limit set to the frequency should thus be lower than the minimum value which may be taken by the lower end of said range, and the maximum limit higher than the maximum value which may be taken by the higher end of said range. This significantly reduces the effectiveness of the frequency limitation as a means for preventing abnormal operational conditions.

A response to said problems consists of using a converter control based on a charge-mode control (CMC); said method has been described for the first time in the article "Charge Control: Analysis, Modeling and Design" to W. Tang, F. C. Lee, R. B. Ridley and I. Cohen, presented at the Power Electronics Specialists Conference, 1992. PESC '92 Record, 23rd Annual IEEE 29 Jun.-3 Jul. 1992 Page(s): 503-511 vol. 1. The idea of applying it to the resonant converters, instead, dates back to the article "Charge control for zero-voltage-switching multi-resonant converter" to W. Tang, C. S. Leu and F. C. Lee, presented at the Power Electronics Specialists Conference, 1993. PESC '93 Record, 24th Annual IEEE 20-24 Jun. 1993 Pages: 229-233.

In the first article, a small signal analysis shows that the dynamics of a CMC-controlled converter is similar to that of a peak current mode-controlled system, i.e. with a single, low-frequency pole and a pair of complex conjugate poles at half the switching frequency. Unlike peak current mode, where the damping factor of said pair of poles depends only on the duty cycle (this is connected to the well known subharmonic instability, when this is higher than 50%), with CMC control such damping factor depends also on the storage inductance of the converter and on the load. The subharmonic instability problem is more complex to be analyzed. As a trend, the instability tends to occur for low values of the input current and, therefore, of the load of the converter. In both methods, however, adding a compensation ramp to the ramp of the current (or the integral thereof in case of CMC), solves the problem. Moreover, the integration process makes the CMC method more noise insensitive than peak current mode.

In the second article (by Tang et al), a control device of the CMC type is disclosed. It is adapted to a resonant forward topology and realized in a discrete form: the current passing through the primary power circuit is directly integrated by using a current transformer with two output windings and two separate rectification systems for charging two series-connected integrating capacitors. This system is not well suited to be integrated; furthermore, current sensing systems with transformers are used in high power conversion systems and not in low power systems for cost reasons.

BRIEF SUMMARY

In accordance with the present disclosure, an object is achieved by a control device for a resonant converter, said converter comprising a switching circuit adapted to drive a resonant load, said resonant load comprising at least one transformer with at least a primary winding and at least a secondary winding, said converter being adapted to convert an input signal into an output signal, said switching circuit comprising at least a half bridge of first and second switches, the central point of said half bridge being connected to said resonant load, characterized in that it comprises first means adapted to rectify a signal representative of the current circulating in the primary winding, second means adapted to integrate at least said rectified signal and being adapted to generate at least a control signal of said switching circuit according to the integrated signal, third means adapted to send a reset command to said second means so as to inhibit the operation over a time period between the instant when said integrated signal reaches or overcomes a first signal and the instant of the next zero crossing of the signal representative of the current circulating in the primary winding.

By virtue of the present disclosure, a control device for resonant converters may be provided, which allows the dynamic order of the converter to be reduced, by possibly making it equivalent to a single-pole system (at least in the frequency range relevant to the design of the frequency compensation), so as to improve its transient response to load variations.

Moreover, said control device reduces the audio-susceptibility of the converter, either through a reduced sensitivity to the variations of the input voltage and/or to the possibility of more freely setting the loop gain, so as to improve both the transient response to the variations of the input voltage, and the rejection of the input voltage ripple.

The control device also allows the operational limits of the converter to be set, regardless of the dispersion of the resonant circuit parameters, so as to improve the control strength.

BRIEF DESCRIPTION OF THE SEVERAL VIEWS OF THE DRAWINGS

The features and advantages of the present disclosure will become apparent from the following detailed description of practical embodiments thereof, shown by way of non-limiting example in the accompanying drawings, in which.

DETAILED DESCRIPTION

Figure 3:
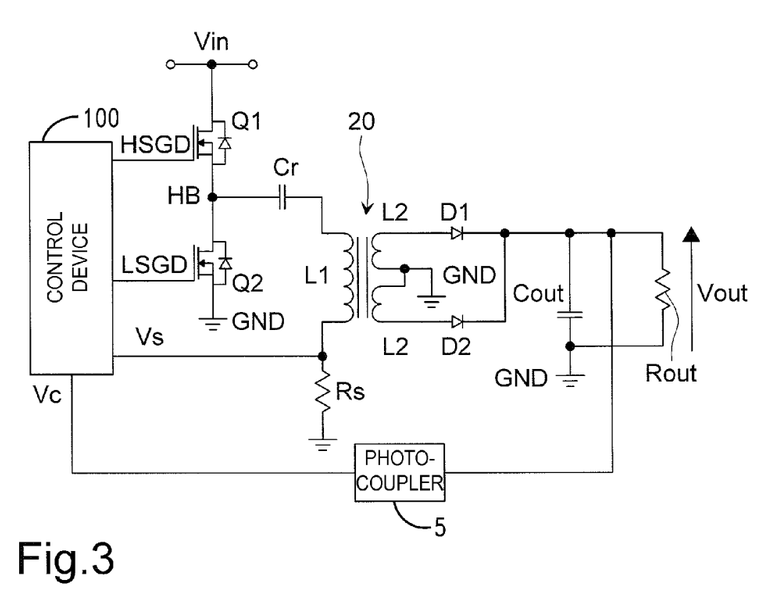
FIG. 3 shows a circuit schematic of a resonant converter with charge-mode control device in accordance with the present disclosure.

FIG. 3 shows a diagram of a resonant converter with a charge-mode control (CMC) control device 100 in accordance with the present disclosure.

The converter comprises a resonant load preferably comprising a transformer 20 with a primary winding L1 and a secondary with two windings L2; the primary winding L1 is connected to the central point HB of the half bridge, the common terminal of the transistors Q1 and Q2, by means of a capacitor Cr and it is directly connected to a sense resistor Rs connected to ground GND. The two windings L2 of the secondary are connected between ground GND and two respective diodes D1 and D2 having the cathodes in common and connected to the parallel of a resistance Rout and a capacitor Cout connected to ground GND. Transistors Q1 and Q2 are preferably MOS transistors, particularly NMOS transistors; the drain terminal of the transistor Q2 is in common with the source terminal of the transistor Q1 and is the central point HB of the half bridge. The Resistor Rs is connected between a terminal of the primary winding L1 and ground GND. In the primary winding L1 the resonant current Ir flows.

FIG. 3 depicts the current sense element in the switching circuit Q1-Q2 represented by the resistor Rs placed in series to the resonant circuit Cr, 20, in particular to the primary L1 of the transformer 20, whereby at its terminals thereof there will be a voltage proportional to the current passing through the resonant circuit. This is a non-limiting example only: the sensing may also be carried out in other ways of the prior art (through a capacitive or resistive divider, with a current transformer, Hall sensor, etc.) providing a voltage signal accurately representative of the instantaneous current passing through the resonant circuit.

The resonant current has zero average value (due to the presence of the capacitor arranged in series) and, therefore, has both positive and negative values. The voltage signal Vs which is brought to the input of the control device will then have positive and negative values. The circuits connected to this input should at least tolerate negative voltages with respect to the ground (normally lower, as an absolute value, than 1 V) without leading to malfunctions.

The control device 100 comprises first means 110 adapted to integrate at least one signal Vs representative of the resonant current Ir and generate at least a control signal HSGD, LSGD of said switching circuit. Device 100 has at the input the voltage Vs at the terminals of resistor Rs, and a voltage signal Vc or a current signal Ic provided by block 5 representing a feedback loop of the output voltage Vout; the current signal Ic or the voltage signal Vc is a control signal and is representative of the feedback loop controlling the output voltage Vout, preferably current signal Ic or the voltage signal Vc is a function of the output current Iout and/or the input voltage Vin of the converter.

Figure 4:
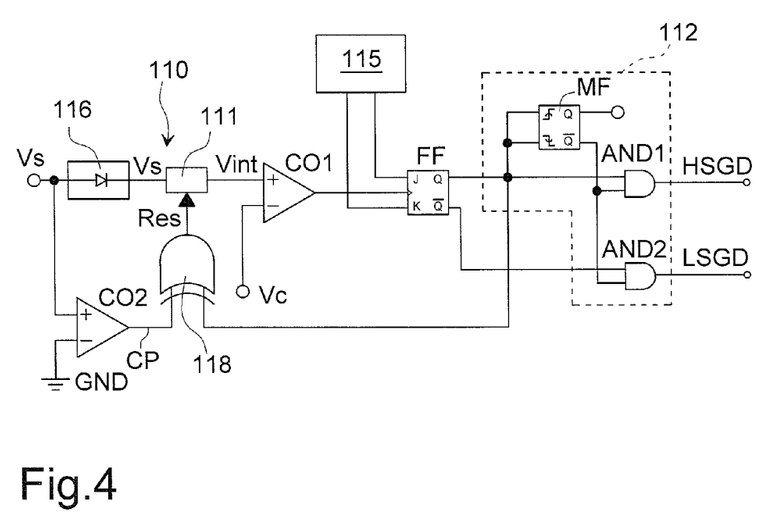
FIG. 4 shows a circuit schematic of a control device for a resonant converter in accordance with the first embodiment of the present disclosure.

FIG. 4 shows a diagram of a control device for a resonant converter in accordance with the first embodiment of the present disclosure.

The voltage Vs (voltage image of the resonant current) is rectified by an ideal full-wave rectifier 116 and the generated voltage Vs' is brought to the input of the resettable integrator 111. Its output voltage Vint is compared to the control voltage Vc generated by the control loop of the output voltage Vout of the converter by a comparator CO1; in particular, the voltage Vint is at the non-inverting input terminal of the comparator while voltage Vc is at the inverting input terminal.

The output of the comparator CO1 is brought to the data input of a flip-flop FF of the J-K type. The inputs J and K thereof are set by an initialization circuit 115 so that before the first operating cycle the signal Q at the output of a flip-flop FF is high. Then, as the first operating cycle starts, both the inputs J and K are set at a high logic level, so that the J-K flip-flop acts as a flip-flop of the T (Toggle) type, thus changing the state of the output at each high transition of CO1.

The output Q of the flip-flop FF is connected to an input of the AND gate AND1 while the output $\overline{Q}$ is connected to an input of the AND gate AND2. The signals HSGD and LSGD at the output of the gates AND1 and AND2 are the driving signals for the transistors Q1 and Q2 of the half bridge of the resonant converter in FIG. 3 and may take a high logic value or a low logic value.

The control device comprises means FF, CO1, 118, CO2 adapted to send a reset command Res to said integrator so as to inhibit the operation thereof for a time period Tres between the instant when the integrated signal reaches or exceeds a first signal Vc and the instant of the next zero crossing of the signal Vs representative of the current Ir circulating in the primary winding.

The reset input Res of the integrator 111, operated by the positive edges or levels, is connected to the output of a XOR (exclusive OR) gate 118, which receives at the inputs thereof the output Q of the J-K flip-flop FF and the CP signal, output of the comparator CO2 comparing the voltage Vs to zero. The signal Res is high, so making the output Vint of the integrator 111 equal to zero, when the CP signals and Q are discordant, which occurs at the beginning of every switching on cycle for transistors Q1 and Q2, when the current still has the sign it had in the previous switching half cycle and until the polarity changes.

Therefore, the system operates in the same way on both the positive and negative half waves of the resonant current, with the integration ramp starting as soon as the current takes the same sign as the voltage applied to the resonant circuit (positive when the transistor Q1 is on and negative when the transistor Q2 is on).

When the output Q of the flip-flop FF is high, the signal HVGD is high, Q1 is on and the signal LSGD is low and therefore Q2 is off. The integrator 111 had previously been reset and therefore the voltage Vint starts from zero. When the resonant current Ir is positive, the output of gate 118 goes low thus unlocking the integrator, so that the voltage ramp Vint may start. When Vint≥Vc, the output of comparator CO1 goes high and changes the condition of flip-flop FF; therefore, the output Q goes low along with HSGD, while the output $\overline{Q}$ goes high.

The low signal HSGD immediately switches the transistor Q1 off, but transistor Q2 which should switch on as signal $\overline{Q}$ is high, still remains switched off for a time Td due to the action of the dead time generator block 112 comprising a monostable circuit MF and the two gates AND1 and AND2. This block maintains the signal LSGD low for a time Td. This delay is needed, upon switching Q1 off, to let the voltage of the node HB (midpoint of the half-bridge) go to zero. In this way, when transistor Q2 is switched on the drain-source voltage thereof is substantially zero (in particular slightly negative, clamped by the body diode of transistor Q2). The same obviously occurs during the opposite transition, between switching off the transistor Q2 and switching on the transistor Q1. This is the soft-switching mechanism that eliminates switching losses at turn-on. The time Td is fixed by the duration of low level of the monostable output that sets the signals HSGD and LSGD both low during this time through the AND gates. The time Td may be internally fixed or adapted to the transition speed of the midpoint voltage by appropriate control systems.

Therefore, after elapsing the time Td, the transistor Q2 will be switched on and the resonant current will exactly have the same evolution seen in the previous half cycle where the transistor Q1 was on, but with opposite sign. Due to the rectifier 116, the signal seen by the integrator will be exactly the same as that seen in the previous half cycle. Differently from the previous cycle, however, the output of gate 118 goes low thus unlocking the integrator and activating the voltage ramp Vint when Ir is negative.

Figure 6:
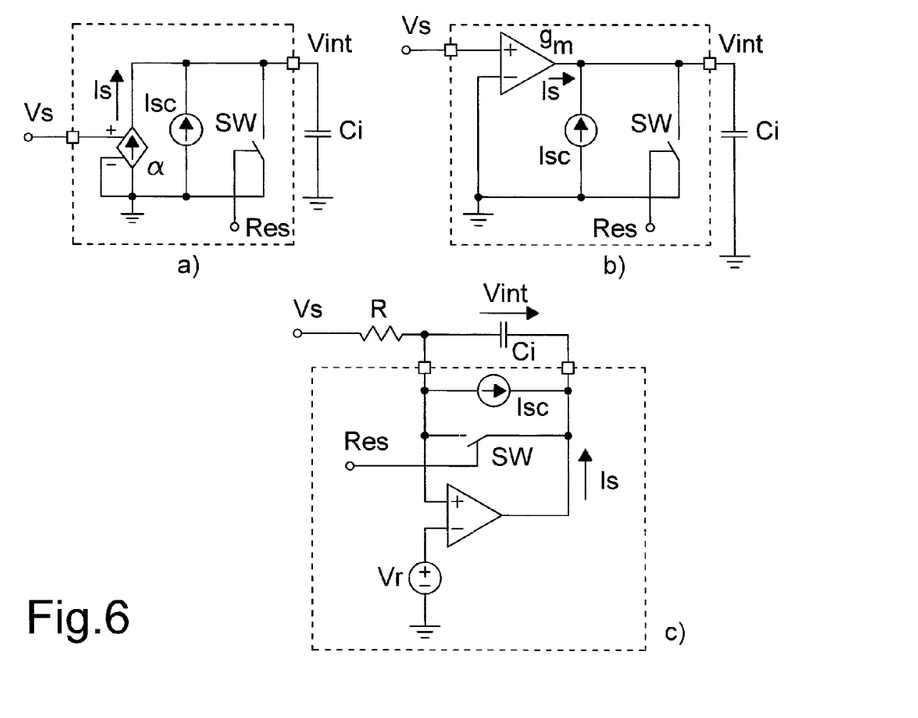
FIG. 6 shows some implementations of the integrator in FIG. 4.

The integrator shown in FIG. 4 may be realized in different ways. Some examples are shown in FIG. 6. Circuit a) comprises a current generator $I_S$ driven by the voltage Vs' charging the capacitor Ci with a current proportional to Vs' according to the factor. The generator Isc is the generator operating the compensation to avoid the sub-harmonic instability. The Isc value may be fixed or dependent on one of the parameters of the control or, more generally, of the whole converter (e.g. the input voltage). Considering the constitutive equation of the capacitor, the voltage Vint at its ends will be proportional to the integral of Vs' during the time when Q1 is on:

$$Vi(t) = \frac{1}{Ci} \int_0^t [\alpha Vs(t) + Isc] dt$$

The switch SW connected in parallel to the capacitor Ci and controlled by the signal Res, is switched on to discharge the capacitor Ci itself and make its voltage Vint equal to zero (reset function).

The controlled current generator shown in circuit a) may be realized with an operational transconductance amplifier as shown in circuit b). Its transconductance $g_m$ corresponds to the gain of the controlled generator of circuit a). In both cases, the capacitor Ci will preferably be a component external to the integrated device U1 comprising the control device in accordance with the invention, and therefore connected to a special pin to provide the user with a calibration means of the time constant of the integration block.

In circuit c), there is an operational amplifier with the inverting input connected to the voltage Vs through the resistance R and the non-inverting input connected to a fixed voltage Vr, conveniently assumed equal to zero. The capacitor Ci is placed between its inverting input and the output so as to form an integrator circuit with a time constant R Ci. The discharge switch SW operates exactly as in circuits a) and b). The voltage Vint across Ci is given by:

$$Vi(t) = \frac{1}{Ci} \int_0^t \left[ \frac{1}{R} Vs(t) + Isc \right] dt$$

and therefore it determinates an operation similar to that of the other circuits.

The transistor-level circuit formation of the driven generator of the circuit a) or the operationals of circuits b) and c) causes some problems due to that at the initial conduction phase of Q1, the output Vint of the integrator takes negative values. The circuit topologies adopted must take it into account.

It should be noted that during all the period when the signal Res is high, the switch SW remains switched on and short-circuits the current generators. Even if it is not specifically shown in the circuits of FIG. 6, means disabling said generators during the period when the switch SW is closed could be optionally provided so as to reduce the consumptions.

In circuits a) and b), the input impedance of the pin connected to the voltage Vs' may also be very high (if the input stage is formed by MOSFETs, virtually infinite). In circuit c), instead, the charge current of Ci is output from said pin and flows on resistor Rs. Normally, this is not a problem because the charge currents are typically in the ten or hundred μA, by far less than the resonant current. Anyway, should this be a problem, this point could be a discriminating element when choosing the solution to be adopted in a specific device.

When Is<<Isc, i.e. when the resonant current and therefore the voltage Vs' are low (which happens when the converter load is low, or when the converter starts due to the so-called "soft-start" circuits which cause the current to gradually increase so as to limit the stresses on the power components), the charge of Ci is almost completely due to Isc. Therefore, the control tends to lose the CMC features and take those of a direct control of the durations of the conduction periods, as done by the direct frequency control DFC, with a consequent degradation of the dynamic performance and of the control robustness to variations in parameters of the resonant circuit.

Figure 5:
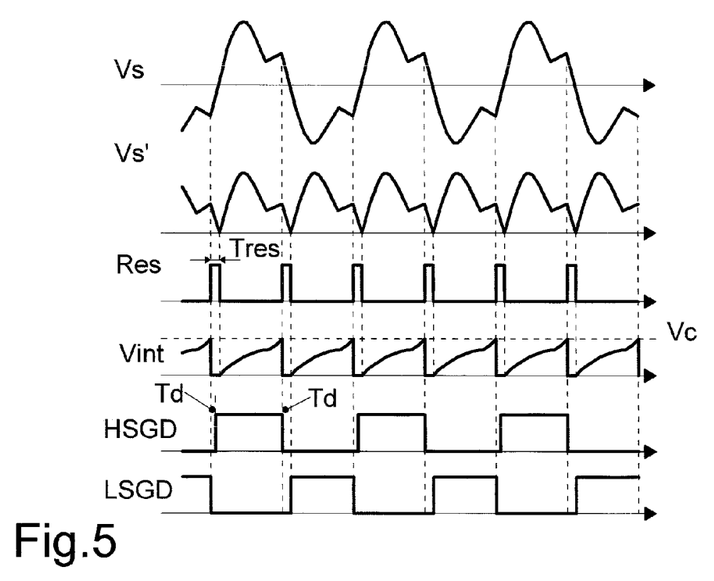
FIG. 5 shows some time diagrams of signals involved in the device of FIG. 4.

FIG. 5 shows the time diagrams of the signals Vs, Res, Vint, Vs', HSGD and LSGD related to the control device in FIG. 4.

Figure 7:
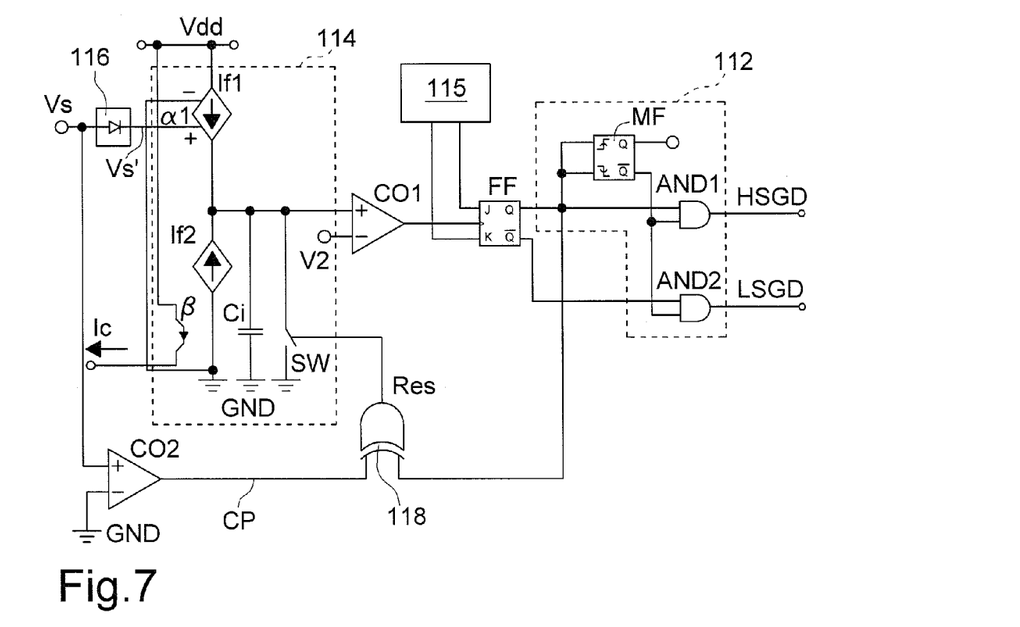
FIG. 7 shows a circuit schematic of a control device for a resonant converter in accordance with the second embodiment of the present disclosure.
Figure 8:
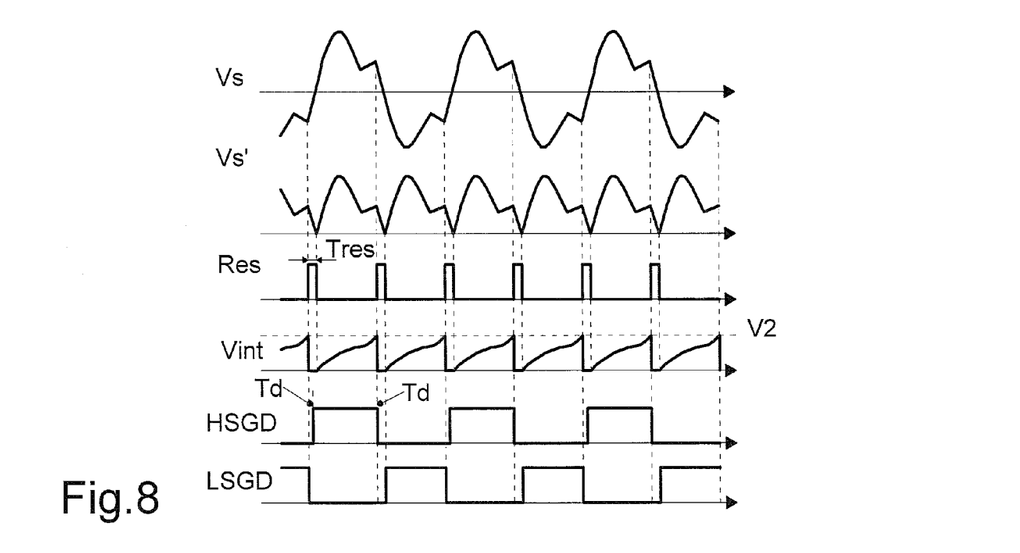
FIG. 8 shows some time diagrams of signals involved in the device of FIG. 7.

FIG. 7 shows a control device in accordance with the second embodiment of the present disclosure.

Said device differs from that shown in the second embodiment for the presence of a different integration circuit having at the input, in addition to the voltage Vs', the current Ic representative of the feedback loop that controls the output voltage Vout of the resonant converter. Indeed, the signal provided by block 5 of the converters of FIGS. 2 and 3 is often a current. This current is at the minimum value in its range when the converter draws the maximum current from the input source (i.e., with maximum load and minimum input voltage) and reaches the maximum value when the input current is at a minimum (i.e., with minimum load and maximum input voltage).

In this embodiment, the current Ic is used directly, in other possible equivalent embodiments it might be previously converted into voltage.

In FIG. 7 the resettable integrator 114 has at the input the voltage Vs' and the current Ic in addition to the reset signal Res. The integrator 114 comprises an integration capacitor Ci that is charged by the sum of a current If1 proportional to the voltage Vs', which is an image of the resonant current according to the constant, as in circuit a) of FIG. 6, and a current If2 proportional to the control current Ic according to the constant. The integrator 114 thus comprises a current generator If1 controlled by the voltage Vs and a current generator If2 controlled by the current Ic. The voltage ramp generated on the capacitor Ci is then compared to a voltage V2 by the comparator CO1 for determining the half bridge switching. The integrator 114 comprises a switch SW arranged in parallel to the capacitor Ci and controlled by the signal Res.

The operation of the control device of FIG. 7 is the same as that of the device in FIG. 4.

The voltage V2 is not affected by the control loop, which does not imply it is necessarily a fixed voltage. It might be a function of some other electrical quantities, for example the converter input voltage.

In such a case the control device comprises means FF, CO1, 118, CO2 adapted to send a reset command Res to the integrator 114 to inhibit the operation thereof over a time period Tres between the instant when the integrated signal reaches or overcomes the signal V2 and the instant of the next zero crossing of the signal Vs representative of the current Ir circulating in the primary winding.

The integrator/feedback combination realized in the block 114 is consistent with the operation of the converter: when the input current of the converter is to be at a maximum (and Ic, according to the above, is at a minimum under these conditions), most of the contribution to the voltage ramp on Ci should be provided by If1; therefore there will be a high signal Vs and a high current through the resonant circuit. On the contrary, when the current of the converter is to be at a minimum (and the current Ic, according to the above, is at a maximum under these conditions), most of the contribution to the voltage ramp Vint on the capacity Ci should be provided by the current If2; therefore there will be a small amplitude signal Vs and a small current will pass through the resonant circuit.

Furthermore, the current Ic also changes consistently with what required to prevent the problem of sub-harmonic instability. With heavy loads, where there is no problem of instability, current Isc should be small with respect to If1 so that the voltage Vint essentially depends on the latter and the operation is as close as possible to that of a pure CMC device; while, with light loads, where the problem arises, the current Isc should be comparable to If1 or even dominant, to ensure system stability. Therefore the control current also takes the role of compensation current.

An integrated circuit U1 comprising the control device for a switching converter in accordance with the present invention may be implemented; the control device may be any one of those shown in FIGS. 3, 4 and 7. The circuit is integrated in a semiconductor chip.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
a rectifier circuit structured to receive an input signal and to generate a rectified signal;
an integrator circuit structured to receive the rectified signal and to generate an integrated signal;
a first comparator structured to receive the integrated signal and a first reference signal and to generate a first comparison signal;
a flip-flop structured to receive the first comparison signal on a first input terminal and to generate first and second output signals on first and second output terminals, respectively; and
a control circuit coupled to the flip-flop and structured to receive the first output signal and structured to generate a control signal to the integrator circuit to inhibit operation of the integrator circuit at a next zero crossing of the input signal.

2. The circuit of claim 1, wherein the control circuit is structured to further inhibit operation of the integrator circuit when the integrated signal reaches or exceeds the first reference signal.

3. The circuit of claim 1, comprising a dead time generator circuit coupled to the flip-flop and structured to inhibit one of the first and second output signals of the flip-flop for a period of time in response to a transition of the other of the first and second output signals from a first state to a second state.

4. The circuit of claim 1, wherein the control circuit comprises:
a second comparator having a first input terminal structured to receive the input signal and a second input terminal structured to receive a second reference signal and to generate a second comparison signal; and
an exclusive OR gate having a first input terminal structured to receive the first output signal of the flip-flop and a second input terminal structured to receive the second comparison signal, and to generate the control signal to the integrator circuit.

5. The circuit of claim 1, comprising a resonant converter having a switching circuit adapted to drive a resonant load, the resonant load including at least one transformer with at least a primary winding and at least a secondary winding, the switching circuit including at least a half bridge of first and second switches coupled together at a common point, the common point being configured to be electrically coupled to the resonant load, the transformer structured to circulate a current in the primary winding that corresponds to the input signal received at the rectifier circuit.

6. The circuit of claim 1, comprising:
a dead time generator circuit coupled to the flip-flop and structured to inhibit one of the first and second output signals of the flip-flop for a period of time during a transition of the other of the first and second output signals from a first state to a second state; and wherein the control circuit includes:

a second comparator having a first input terminal structured to receive the input signal and a second input terminal structured to receive a second reference signal and to generate a second comparison signal; and an exclusive OR gate having a first input terminal structured to receive the first output signal of the flip-flop and a second input terminal structured to receive the second comparison signal, and to generate the control signal to the integrator circuit, the control circuit further structured to inhibit operation of the integrator circuit when the integrated signal reaches or exceeds the first reference signal.

7. A circuit, comprising:
a rectifier circuit structured to rectify an input signal and to generate a rectified signal;
an integrator circuit structured to integrate at least the rectified signal and to generate an integrated signal; and
a reset circuit structured to send a reset command signal to the integrator circuit that is configured to inhibit operation of the integrator circuit over a time period between a time the integrated signal reaches or exceeds a reference signal and a time of the next zero crossing of the input signal rectified by the reset circuit, the reset circuit further structured to send the reset command to the integrator circuit in response to a first switch of a half bridge circuit being off and the signal corresponding to the current circulating in the primary winding being higher than zero or vice versa in response to the first switch being on and the input signal being lower than zero.

8. The circuit according to claim 7, wherein the integrator circuit includes a comparator circuit structured to compare the integrated signal to the reference signal and generate a comparison signal in response to the integrated signal reaching or exceeding the reference signal.

9. The circuit according to claim 8, wherein the reference signal is a constant signal and the rectifier circuit is structured to integrate the rectified signal and a current signal corresponding to an output voltage of the circuit.

10. The circuit according to claim 8, wherein the integrator circuit is structured to generate first and second control signals for the first switch and a second switch of the half bridge circuit, the first switch configured to receive an input voltage, the reset circuit further structured to send the reset command signal to the integrator circuit in response to a first switch of a half bridge circuit being off and the signal corresponding to the current circulating in the primary winding being higher than zero or vice versa in response to the first switch being on and the input signal being lower than zero.

11. A circuit, comprising:
a rectifier circuit structured to rectify an input signal and to generate a rectified signal;
an integrator circuit structured to integrate at least the rectified signal and to generate an integrated signal; and
a reset circuit structured to send a reset command signal to the integrator circuit that is configured to inhibit operation of the integrator circuit over a time period between a time the integrated signal reaches or exceeds a reference signal and a time of a next zero crossing of the input signal;
an initialization circuit;
a half bridge circuit having first and second switches; and
a J-K flip-flop configured to receive on a data input terminal a comparison signal and including inputs J and K configured to be driven by the initialization circuit, and to generate two output signals that are control signals for the first and the second switches of the half bridge circuit.

12. The circuit of claim 11, comprising a comparator circuit structured to compare the integrated signal to the reference signal and generate a comparison signal in response to the integrated signal reaching or exceeding the reference signal.

13. The circuit of claim 12, wherein the reference signal is a constant signal.

14. The circuit of claim 12, wherein the reset circuit is further structured to send the reset command to the integrator circuit in response to the first switch of the half bridge circuit being off and a signal corresponding to the current circulating in a primary winding being higher than zero or vice versa in response to the first switch being on and the signal corresponding to current circulating in the primary winding being lower than zero.

15. A resonant converter, comprising:
at least one transformer with at least a primary winding and at least a secondary winding;
a switching circuit having at least a half bridge circuit of first and second switches, the central point of the half bridge circuit coupled to the primary winding; and
a control device that includes:
a rectifier circuit structured to rectify an input signal and to generate a rectified signal;
a reset circuit structured to generate a reset command signal; and
an integrator circuit structured to integrate at least the rectified signal and to generate an integrated signal, the integrator circuit configured to receive the reset signal and in response to the reset signal inhibit generation of the integrated signal over a time period between the integrated signal reaching or exceeding a reference signal and a next zero crossing of the input signal, the reset circuit further structured to send the reset command signal to the integrator circuit in response to the first switch of the half bridge circuit being off and the signal corresponding to the current circulating in the primary winding being higher than zero or vice versa in response to the first switch being on and the input signal being lower than zero.

16. The converter of claim 15, further comprising a current sensing circuit serially coupled to the primary winding and structured to read current circulating in the primary winding and to generate a signal corresponding to the current circulating in the primary winding.

17. The converter of claim 16, wherein the reference signal is a constant signal and the rectifier circuit is structured to integrate the rectified signal and a current signal corresponding to an output voltage of the circuit.

18. The converter of claim 16, wherein the integrator circuit is structured to generate first and second control signals for the first switch and the second switch of the half bridge circuit, the first switch configured to receive an input voltage, the reset circuit further structured to send the reset command signal to the integrator circuit in response to the first switch being off and the signal corresponding to the current circulating in the primary winding being higher than zero or vice versa in response to the first switch being on and the input signal being lower than zero.

19. The converter of claim 15, wherein the integrator circuit includes a comparator circuit structured to compare the integrated signal to the reference signal and to generate a comparison signal in response to the integrated signal reaching or exceeding the reference signal.

20. A resonant converter, comprising:
an initialization circuit;
a half bridge circuit having first and second switches;
an integrator circuit configured to generate an integrated signal;
a comparator circuit structured to compare the integrated signal to a reference signal and to generate a comparison signal in response to the integrated signal reaching or exceeding the reference signal;
a reset circuit structured to send a reset signal to the integrator circuit in response to the first switch being off and a signal corresponding to current circulating in a primary winding being higher than zero or in response to the first switch being on and the signal corresponding to current circulating in the primary winding being lower than zero; and
a J-K flip-flop configured to receive on a data input terminal the comparison signal from the comparator circuit, and having inputs J and K configured to be driven by the initialization circuit, and to generate two output signals that are control signals for the first and the second switches of the half bridge circuit.

21. The resonant converter of claim 20, wherein the reference signal is a constant signal.

22. A method, comprising:
rectifying a signal corresponding to current circulating in a primary winding;
integrating at least the rectified signal to generate an integrated signal;
generating at least a control signal for a switching circuit in response to the integrated signal; and
inhibiting the integrating over a time period between a time the integrated signal reaches or exceeds a first signal and the time of a next zero crossing of the signal corresponding to the current circulating in the primary winding.

23. The method of claim 22, wherein generating at least a control signal includes generating first and second control signals for first and second switches of a half bridge circuit, and inhibiting the integrating occurs in response to the first switch being off and the signal corresponding to the current circulating in the primary winding being higher than zero or vice versa in response to the first switch being on and the signal corresponding to the current circulating in the primary winding being lower than zero.

* * * * *